(12) United States Patent
Toorians (10) Patent No.: US 9,195,428 B2
(45) Date of Patent: Nov. 24, 2015

(54) METHOD AND SYSTEM FOR DISPLAYING DATA FROM AUXILIARY DISPLAY SUBSYSTEM OF A NOTEBOOK ON A MAIN DISPLAY OF THE NOTEBOOK

(75) Inventor: Arman Toorians, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 705 days.

(21) Appl. No.: 11/398,167

(22) Filed: Apr. 5, 2006

(65) Prior Publication Data

US 2007/0236407 A1 Oct. 11, 2007

(51) Int. Cl.
*G09G 5/00* (2006.01)
*G06F 3/14* (2006.01)
(Continued)

(52) U.S. Cl.
CPC ............ *G06F 3/1438* (2013.01); *G06F 1/1616* (2013.01); *G06F 1/1637* (2013.01); *G06F 1/1643* (2013.01); *G06F 1/1684* (2013.01); *G06F 1/3203* (2013.01); *G06F 1/3265* (2013.01); *G06F 1/3293* (2013.01); *G06F 3/14* (2013.01); *G09G 3/3208* (2013.01); *G09G 3/36* (2013.01); *G09G 2330/021* (2013.01);
(Continued)

(58) Field of Classification Search
CPC ... G06F 1/1616; G06F 1/1643; G06F 1/1684; G06F 1/3203; G06F 1/3265; G06F 1/3293; G06F 3/1438; G06F 1/1637; G06F 3/14; G09G 2360/06; G09G 3/3208; G09G 3/36; G09G 2370/047; G09G 2330/021; Y02B 60/121; Y02B 60/1242
USPC ..................................... 345/1.1–1.3; 713/300
See application file for complete search history.

(56) References Cited

U.S. PATENT DOCUMENTS 4,603,400 A 7/1986 Daniels
4,955,066 A 9/1990 Notenboom
(Continued)

FOREIGN PATENT DOCUMENTS

WO 2005026918 3/2005

OTHER PUBLICATIONS

"System Management Bus (SMBus) Specification," Version 2.0, Aug. 3, 2000 (pp. 1-59).
(Continued)

*Primary Examiner* — Sahlu Okebato (57) ABSTRACT

In some embodiments, a notebook including a main display, a main graphics subsystem, and an auxiliary display subsystem, but typically not an auxiliary display, wherein the notebook is configured to display on the main display one or both of data from the auxiliary display subsystem (or a scaled or otherwise processed version of such data), and data from the main graphics subsystem. Preferably, the notebook is configured to display a scaled version of data from the auxiliary display subsystem on part of the main display's screen. Other embodiments are timing controllers and other circuitry for use in such a notebook and methods for displaying data from such a notebook's auxiliary display subsystem on all or part of the main display's screen. The notebook can include a timing control subsystem for asserting to the main display one or both of display data from the auxiliary display subsystem (or a processed version thereof) and display data from the main graphics subsystem. The timing control subsystem can include a scaler for receiving raw auxiliary display data and a multiplexer having inputs for receiving the output of the scaler and display data from the main graphics subsystem.

38 Claims, 3 Drawing Sheets

(51) Int. Cl.
*G06F 1/16* (2006.01)
*G06F 1/32* (2006.01)
G09G 3/32 (2006.01)
G09G 3/36 (2006.01)

(52) U.S. Cl.
CPC ...... *G09G2360/06* (2013.01); *G09G 2370/047* (2013.01); *Y02B 60/121* (2013.01); *Y02B 60/1242* (2013.01)

(56) References Cited

U.S. PATENT DOCUMENTS

| | | | |
|---|---|---|---|
| 5,321,510 A | 6/1994 | Childers et al. | |
| 5,572,649 A | 11/1996 | Elliott et al. | |
| 5,687,334 A | 11/1997 | Davis et al. | |
| 5,768,164 A | 6/1998 | Hollon, Jr. | |
| 5,878,264 A | 3/1999 | Ebrahim | |
| 5,900,913 A * | 5/1999 | Tults | 348/468 |
| 5,953,532 A | 9/1999 | Lochbaum | |
| 5,978,042 A | 11/1999 | Vaske et al. | |
| 6,025,841 A | 2/2000 | Finkelstein et al. | |
| 6,191,758 B1 * | 2/2001 | Lee | 345/2.2 |
| 6,226,237 B1 | 5/2001 | Chan et al. | |
| 6,337,747 B1 | 1/2002 | Rosenthal | |
| 6,407,752 B1 | 6/2002 | Harnett | |
| 6,483,515 B1 | 11/2002 | Hanko | |
| 6,498,721 B1 | 12/2002 | Kim | 361/681 |
| 6,628,243 B1 * | 9/2003 | Lyons et al. | 345/1.1 |
| 6,654,826 B1 | 11/2003 | Cho et al. | 710/62 |
| 6,774,912 B1 * | 8/2004 | Ahmed et al. | 345/629 |
| 6,784,855 B2 | 8/2004 | Matthews et al. | 345/1.1 |
| 6,816,977 B2 | 11/2004 | Brakmo et al. | |
| 6,871,348 B1 | 3/2005 | Cooper | |
| 6,897,882 B1 * | 5/2005 | Kim | 345/659 |
| 6,956,542 B2 | 10/2005 | Okuley et al. | |
| 7,030,837 B1 | 4/2006 | Vong et al. | |
| 7,036,089 B2 | 4/2006 | Bauer | |
| 7,103,850 B1 | 9/2006 | Engstrom et al. | |
| 7,127,745 B1 | 10/2006 | Herse et al. | |
| 7,149,982 B1 | 12/2006 | Duperrouzel et al. | |
| 7,359,998 B2 | 4/2008 | Chan et al. | |
| 7,486,279 B2 * | 2/2009 | Wong et al. | 345/173 |
| 7,486,337 B2 * | 2/2009 | Bian | 348/589 |
| 7,509,444 B2 | 3/2009 | Chiu et al. | |
| 7,546,546 B2 | 6/2009 | Lewis-Bowen et al. | |
| 7,558,884 B2 * | 7/2009 | Fuller et al. | 709/248 |
| 7,590,713 B2 | 9/2009 | Brockway et al. | |
| 7,783,985 B2 | 8/2010 | Indiran et al. | |
| 8,190,707 B2 | 5/2012 | Trivedi et al. | |
| 8,782,291 B2 | 7/2014 | Toorians et al. | |
| 2001/0028366 A1 | 10/2001 | Ohki et al. | |
| 2002/0054141 A1 | 5/2002 | Yen et al. | |
| 2002/0057295 A1 | 5/2002 | Panasyuk et al. | |
| 2002/0087225 A1 | 7/2002 | Howard | |
| 2002/0129288 A1 | 9/2002 | Loh et al. | |
| 2002/0140627 A1 | 10/2002 | Ohki et al. | |
| 2002/0175933 A1 | 11/2002 | Ronkainen et al. | |
| 2002/0182980 A1 | 12/2002 | Van Rompay | |
| 2002/0196279 A1 | 12/2002 | Bloomfield et al. | |
| 2003/0016205 A1 | 1/2003 | Kawabata et al. | |
| 2003/0025689 A1 * | 2/2003 | Kim | 345/211 |
| 2003/0041206 A1 | 2/2003 | Dickie | |
| 2003/0065934 A1 | 4/2003 | Angelo et al. | |
| 2003/0088800 A1 | 5/2003 | Cai | |
| 2003/0100963 A1 * | 5/2003 | Potts et al. | 700/83 |
| 2003/0105812 A1 | 6/2003 | Flowers, Jr. et al. | |
| 2003/0126335 A1 | 7/2003 | Silvester | |
| 2003/0160816 A1 | 8/2003 | Zoller et al. | |
| 2003/0177172 A1 | 9/2003 | Duursma et al. | |
| 2003/0179240 A1 | 9/2003 | Gest | |
| 2003/0179244 A1 | 9/2003 | Erlingsson | |
| 2003/0188144 A1 | 10/2003 | Du et al. | |
| 2003/0208529 A1 | 11/2003 | Pendyala et al. | |
| 2003/0222915 A1 | 12/2003 | Marion et al. | |
| 2003/0225872 A1 | 12/2003 | Bartek et al. | |
| 2003/0229900 A1 | 12/2003 | Reisman | |
| 2004/0019724 A1 | 1/2004 | Singleton, Jr. et al. | |
| 2004/0027315 A1 * | 2/2004 | Senda et al. | 345/30 |
| 2004/0066414 A1 | 4/2004 | Czerwinski et al. | |
| 2004/0070608 A1 | 4/2004 | Saka | |
| 2004/0075769 A1 * | 4/2004 | Shy et al. | 348/565 |
| 2004/0095382 A1 | 5/2004 | Fisher et al. | |
| 2004/0145605 A1 | 7/2004 | Basu et al. | |
| 2004/0153493 A1 | 8/2004 | Slavin et al. | |
| 2004/0184523 A1 * | 9/2004 | Dawson et al. | 375/240.1 |
| 2004/0201780 A1 * | 10/2004 | Kim | 348/565 |
| 2004/0222978 A1 * | 11/2004 | Bear et al. | 345/184 |
| 2004/0224638 A1 | 11/2004 | Fadell et al. | 455/66.1 |
| 2004/0225901 A1 * | 11/2004 | Bear et al. | 713/300 |
| 2004/0225907 A1 | 11/2004 | Jain et al. | |
| 2004/0235532 A1 | 11/2004 | Matthews et al. | 455/566 |
| 2004/0260565 A1 | 12/2004 | Zimniewicz et al. | |
| 2004/0268004 A1 | 12/2004 | Oakley | |
| 2005/0059346 A1 * | 3/2005 | Gupta et al. | 455/41.2 |
| 2005/0064911 A1 | 3/2005 | Chen et al. | |
| 2005/0066209 A1 | 3/2005 | Kee et al. | |
| 2005/0073515 A1 | 4/2005 | Kee et al. | |
| 2005/0076088 A1 | 4/2005 | Kee et al. | 709/206 |
| 2005/0091610 A1 | 4/2005 | Frei et al. | |
| 2005/0125739 A1 | 6/2005 | Thompson et al. | |
| 2005/0132299 A1 | 6/2005 | Jones et al. | |
| 2005/0140566 A1 * | 6/2005 | Kim et al. | 345/1.1 |
| 2005/0182980 A1 * | 8/2005 | Sutardja | 713/320 |
| 2005/0240873 A1 | 10/2005 | Czerwinski et al. | |
| 2005/0262302 A1 | 11/2005 | Fuller et al. | |
| 2005/0268246 A1 | 12/2005 | Keohane et al. | |
| 2006/0007051 A1 | 1/2006 | Bear et al. | |
| 2006/0095617 A1 | 5/2006 | Hung | |
| 2006/0109198 A1 * | 5/2006 | Chow et al. | 345/1.1 |
| 2006/0119537 A1 | 6/2006 | Vong et al. | |
| 2006/0119538 A1 | 6/2006 | Vong et al. | |
| 2006/0125784 A1 | 6/2006 | Jang et al. | |
| 2006/0129855 A1 | 6/2006 | Rhoten et al. | |
| 2006/0130075 A1 | 6/2006 | Rhoten et al. | |
| 2006/0142878 A1 | 6/2006 | Banik et al. | |
| 2006/0150230 A1 * | 7/2006 | Chung et al. | 725/118 |
| 2006/0164324 A1 | 7/2006 | Polivy et al. | |
| 2006/0232494 A1 * | 10/2006 | Lund et al. | 345/1.1 |
| 2006/0250320 A1 | 11/2006 | Fuller et al. | |
| 2007/0046562 A1 | 3/2007 | Polivy et al. | |
| 2007/0050727 A1 | 3/2007 | Lewis-Bowen et al. | |
| 2007/0052615 A1 | 3/2007 | Van Dongen et al. | |
| 2007/0067655 A1 * | 3/2007 | Shuster | 713/300 |
| 2007/0079030 A1 | 4/2007 | Okuley et al. | |
| 2007/0083785 A1 | 4/2007 | Sutardja | |
| 2007/0103383 A1 | 5/2007 | Sposato et al. | |
| 2007/0195007 A1 | 8/2007 | Bear et al. | |
| 2008/0034318 A1 | 2/2008 | Louch et al. | |
| 2008/0130543 A1 | 6/2008 | Singh et al. | |
| 2008/0172626 A1 | 7/2008 | Wu | |
| 2008/0297433 A1 | 12/2008 | Heller et al. | |
| 2008/0320321 A1 | 12/2008 | Sutardja | |
| 2009/0021450 A1 | 1/2009 | Heller et al. | |
| 2009/0031329 A1 | 1/2009 | Kim | |
| 2009/0059496 A1 | 3/2009 | Lee | |
| 2009/0172450 A1 | 7/2009 | Wong et al. | |
| 2009/0193243 A1 | 7/2009 | Ely | |
| 2010/0010653 A1 | 1/2010 | Bear et al. | |
| 2010/0033433 A1 | 2/2010 | Utz et al. | |
| 2010/0033916 A1 | 2/2010 | Douglas et al. | |
| 2011/0219313 A1 | 9/2011 | Mazzaferri | |

OTHER PUBLICATIONS

PCWorld.com, "Microsoft Pitches Display for Laptop Lids" dated Feb. 10, 2005, pp. 1-2, downloaded from the Internet on Mar. 8, 2006 from http://www.pcworld.com/resource/article/0,aid,119644.asp.

Microsoft Corporation, "Microsoft Windows Hardware Showcase", dated Apr. 28, 2005, pp. 1-5, downloaded from the internet on Sep. 15, 2005 from http://www.microsoft.com/whdc/winhec/hwsowcase05.mspx.

(56) References Cited

OTHER PUBLICATIONS

Paul Thurrot's SuperSite for Windows, "WinHEC 2004 Longhorn Prototypes Gallery", dated May 10, 2004, pp. 1-4, downloaded from the internet on Sep. 15, 2005 from http://www.winsupersite.com/showcase/longhorn_winhec_proto.asap.

Vulcan Inc., "Connectivity FAQ", p. 1, downloaded from the internet on Sep. 20, 2005 from http://www.flipstartpc.com/faq_connectivity.asp.

Vulcan Inc., "Product Features: LID Module", p. 1, downloaded from the internet on Sep. 19, 2005 from http://www.flipstartpc.com/aboutproduct_features_lidmodule.asp.

Vulcan Inc., "Product Features: Size and Performance", p. 1, downloaded from the internet on Sep. 20, 2005 from http://www.flipstartpc.com/aboutproduct_features_sizeandpower.asp.

Vulcan Inc., "Software FAQ", p. 1, downloaded from the internet on Sep. 20, 2005 from http://www.flipstartpc.com/faq_software.asp.

Handtops.com, "FlipStart PC in detail", pp. 1-4, downloaded from the internet on Sep. 20, 2005 from http://www.handtops.com/show/news/5.

Andrew Fuller; "Auxiliary Display Platform in Longhorn"; Microsoft Corporation; The Microsoft Hardware Engineering Conference Apr. 25-27, 2005; slides 1-29.

"Usage: NVIDIA GeForce 6800—PCIe x16", Dell, archived Jan. 15, 2006 by archive.org, Downloaded Jun. 29, 2011, http://web.archive.org/web/20060115050119/http://support.dell.com/support/edocs/video/P82192/en/usage.htm.

"Graphics: Intel® 82852/82855 Graphics Controller Family", Intel, Archived Nov. 2, 2006 by archive.org, Downloaded Jun. 30, 2011, http://web.archive.org/web/20061103045644/http://www.intel.com/support/graphics/intel852gm/sb/CS-009064.htm?.

"Epson: EMP Monitor V4.10 Operation Guide", by Seiko Epson Corp., 2006, http://support.epson.ru/products/manuals/100396/Manual/EMPMonitor.pdf.

"The Java Tutorial: How to Use Combo Boxes", Archived Mar. 5, 2006 by archive.org, Downloaded Jun. 30, 2011, http://web.archive.org/web/20050305000852/http://www-mips.unice.fr/Doc/Java/Tutorial/uiswing/components/combobox.html.

\* cited by examiner

METHOD AND SYSTEM FOR DISPLAYING DATA FROM AUXILIARY DISPLAY SUBSYSTEM OF A NOTEBOOK ON A MAIN DISPLAY OF THE NOTEBOOK

CROSS-REFERENCE TO RELATED APPLICATION

This application is related to U.S. patent application Ser. No. 11/398,168, filed Apr. 5, 2006, entitled "Method and System for Communication Between a Secondary Processor and an Auxiliary Display Subsystem of a Notebook," naming Aleksandr Frid as the inventor, assigned to the assignee of the present application.

FIELD OF THE INVENTION

The invention pertains to methods and systems (e.g., notebook computers) for displaying data asserted by an auxiliary display subsystem of a notebook. In some embodiments, the invention is a notebook (having a main display, a graphics chipset or other main graphics subsystem, and an auxiliary display subsystem) configured to display (on the main display) data from the auxiliary display subsystem or data from the main graphics subsystem.

BACKGROUND OF THE INVENTION

The expression "notebook" herein denotes a notebook computer, tablet PC, PDA (personal digital assistant), smart cellular phone (e.g., one capable of playing and displaying multimedia content), or other portable computer or computing system having a central processing unit ("CPU").

The expression "auxiliary display subsystem" herein denotes a subsystem of a notebook that is configured to receive data (and typically cache the received data) from at least one other element of the notebook and to perform (while the notebook is in a standby state or other low-power state) at least one function that at least one other element of the notebook (external to the auxiliary display subsystem) could perform if the notebook were in a fully-powered normal operating mode. Examples of such functions include displaying cached video, still picture, or other image data (received from an element of the notebook external to the auxiliary display subsystem) or a processed version of such cached data on an auxiliary display, or causing such cached data or a processed version thereof to be displayed on all or part of the screen of the notebook's main display; playing back cached audio data (received from an element of the notebook external to the auxiliary display subsystem) or a processed version of such cached data; displaying system information (e.g., information regarding charge level of a battery of the notebook, or information regarding the notebook's state) on an auxiliary display or causing such system information to be displayed on all or part of the screen of the notebook's main display; and answering incoming telephone calls.

The expression "auxiliary display" herein denotes a display of the auxiliary display subsystem which is distinct from the main display of the notebook in which the auxiliary display subsystem is included. Some embodiments of an auxiliary display subsystem do not include an auxiliary display, and instead are coupled and configured to cause the display of data on all or part of the screen of the main display of the notebook including the auxiliary display subsystem (e.g., while the notebook is in a standby state or other low-power state).

The expression "secondary processor" of a notebook (having a central processing unit) shall be used herein to denote any processor of the notebook other than the notebook's CPU. Examples of secondary processors of conventional notebook computers are embedded controllers (e.g., embedded controllers that perform keyboard controller functions as well as other functions).

The acronym "SMB" herein denotes the conventional, two-wire bus known as the "System Management Bus." The most recent version of the SMB is described in the System Management Bus (SMB) Specification, Version 2.0, published on Aug. 3, 2000, and available at http://www.smbus.org/specs.

The expression that a notebook is in a "low-power state" herein denotes that the notebook is operating in a state in which it consumes less power than if it were in a fully-powered, normal operating mode. Examples of low-power states are hibernation and standby states. Typically, a notebook has been booted up (and its central processing unit runs operating system software) when operating in a fully-powered normal operating state, but a notebook must perform a booting operation in order to undergo a transition from a low-power state to a fully-powered normal operating state.

It has been proposed that a notebook include an auxiliary display subsystem for caching data received from other elements of the notebook and displaying the cached data on an auxiliary display.

For example, US Patent Application 2004/0225901 (published on Nov. 11, 2004) discloses an auxiliary display system for use with a main computer (a personal computer or other computing device). The auxiliary display subsystem includes an auxiliary display, a memory, an auxiliary processor, and input devices, is operable while the main computer is in a standby state (e.g., to record voicemail, receive an incoming phone call, or play music), and is said to be capable of waking up the main computer while the main computer is in a standby state. The auxiliary display system can execute applications alone (without the main computer) or "in concert" with the main computer's "main processor." In some implementations, the main computer has a main monitor, and the auxiliary display system is apparently configured to direct "display messages" to the auxiliary display or to forward them for display on the main monitor.

US Patent Application 2004/0222978 (published on Nov. 11, 2004) discloses a control and communications panel for use with a main computer. The control and communications panel can include an auxiliary display, an auxiliary processor, and controls, and can be operable (e.g., to perform telephone or other communication functions) while elements of the main computer are powered down.

US Patent Application 2004/0224638 (published Nov. 11, 2004) discloses a notebook with a built-in docking station for receiving a detachable media player having an auxiliary display and at least one data port (e.g., a USB port) for receiving image, audio, or other data from the notebook or sending data to the notebook. US Application 2004/0224638 suggests generally that communication between the media player and notebook could be one way or two way, and could implement a master/slave, server/client, peer to peer, or other protocol.

US Patent Application 2005/0076088 (published on Apr. 7, 2005) teaches a notebook (or other computer system) having a main display and a detachable module (having a processor, memory, auxiliary display, and input devices such as a fingerprint reader) mounted on the back of the notebook's main display. The detachable module can communicate with the notebook's main processor via a processor bus or communications link (e.g., to wake up the main processor). The detachable module can also perform functions such as displaying email, accessing contact and calendar information, and playing music files (apparently by accessing data previously cached, so as to be accessible by the detachable module, at a time when the notebook was fully powered up and booted up) when the notebook is in a "quiescent low power mode" without the need to boot up the notebook and load its operating system.

SUMMARY OF THE INVENTION

In a class of embodiments, the invention is a notebook including a display (to be referred to herein sometimes as a "main" display), a main graphics subsystem (e.g., graphics chipset), and an auxiliary display subsystem, but not an auxiliary display. In some embodiments, the notebook is configured to display auxiliary display data on a portion (e.g., a relatively small window) of the main display's screen. In typical embodiments, the notebook is configured to be operable (e.g., while in a standby state or other low-power state) to display auxiliary display data on all or part of the main display's screen, or (e.g., while in a fully powered state) to display data from the main graphics subsystem on the main display's screen. In some embodiments, the notebook is configured to display auxiliary display data, and display data from the main graphics subsystem, on different parts of the main display's screen.

Herein, the phrase "auxiliary display data" denotes raw auxiliary display data generated by an auxiliary display subsystem of a notebook, or a scaled or otherwise processed version of such raw auxiliary display data.

In typical embodiments, the notebook includes a timing control subsystem (e.g., a timing controller) configured to assert to the main display (with proper timing) either display data from the main graphics subsystem or auxiliary display data. For example, the timing control subsystem can be coupled and configured to receive raw display data from the auxiliary display subsystem ("raw auxiliary display data") and display data from the main graphics subsystem ("main display data"), to generate auxiliary display data from the raw auxiliary display data (e.g., by scaling the raw auxiliary display data), and to assert either the auxiliary display data (e.g., scaled data), raw auxiliary display data, or main display data to the main display with timing for display on all or a selected portion of the main display's screen (e.g., for display of the auxiliary display data on a selected region of the main display's screen). In some implementations, the timing control subsystem is configured to combine (i.e., multiplex) the auxiliary display data with at least some of the main display data and to assert the combined data to the main display (e.g., for display of the auxiliary display data in a small region of the main display's screen and main display data on another region of the screen). In a class of embodiments, the raw auxiliary display data are asserted to the timing control subsystem over a first link (e.g., an LVDS link), and the main display data are asserted to the timing control subsystem over a second link of the same type as the first link.

The timing control subsystem can include a scaler coupled to receive raw auxiliary display data and a multiplexer having an input coupled to receive the output of the scaler, a second input coupled to receive main display data, and an output coupled to the main display. The multiplexer is configured to assert at its output either the data received at its first input or the data received at its second input. Optionally, the multiplexer is also operable to combine (i.e., multiplex) the auxiliary display data received at its first input with at least some of the main display data received at its second input and to assert the combined data at its output (e.g., for display of the auxiliary display data in a small region of the main display's screen and main display data on another region of the screen).

In a class of preferred embodiments, the main display is an LCD array whose liquid crystal cells are backlit by an array of illumination elements (e.g., LEDs) that are selectively and individually powerable. In other preferred embodiments, the main display has an array of pixels (light-emitting elements) that are selectively and individually powerable, or an array of pixels of which rows and columns are selectively and individually powerable.

In preferred embodiments, the notebook is configured to display auxiliary display data on the main display while in a standby state or other low-power state. In these embodiments, the main display preferably has an array of pixels (light-emitting elements) that are selectively and individually powerable while the notebook is in a low-power state (or an array of pixels of which rows and columns are selectively and individually powerable while the notebook is in a low-power state), and the main display is controlled (in a low-power state of the notebook) to power only pixels needed to display the auxiliary display data (or only rows and columns that include pixels needed to display the auxiliary display data).

Other aspects of the invention are circuitry (e.g., circuits useful as subsystems of notebooks, or timing controllers) for implementing any embodiment of the inventive notebook, and methods for displaying data from an auxiliary display subsystem of a notebook on all or part of the screen of a main display of the notebook.

DETAILED DESCRIPTION OF PREFERRED EMBODIMENTS

In some embodiments of the invention, a conventional System Management Bus (SMB) is used as the underlying transport layer for communications between an auxiliary display subsystem and a secondary processor of a notebook. The bus protocols implemented by some embodiments of the invention for communication over an SMB between an auxiliary display subsystem and a secondary processor are compliant with the above-cited System Management Bus (SMB) Specification, Version 2.0. Notation used herein for SMB protocol description is consistent with that employed in the cited System Management Bus (SMB) Specification, Version 2.0.

Figure 1:
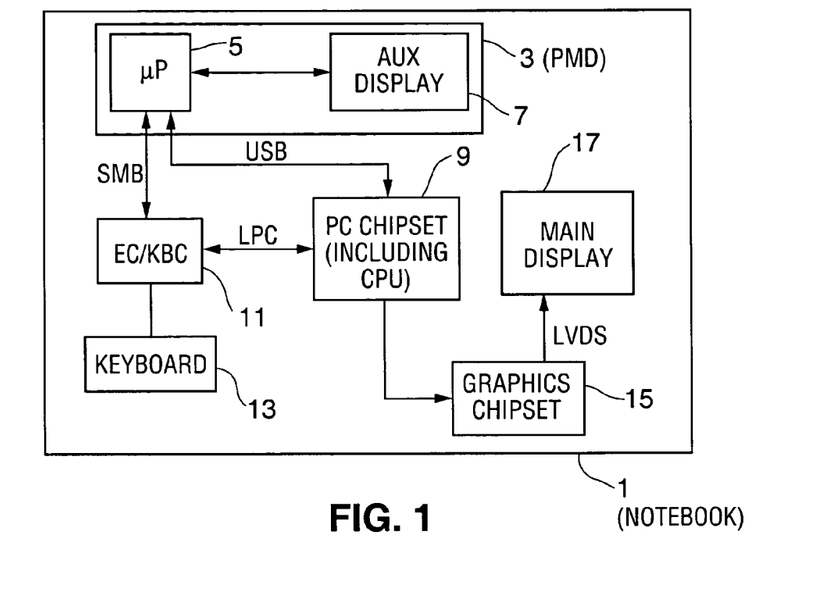
FIG. 1 is a block diagram of an embodiment of a notebook which includes an auxiliary display subsystem (personal media display system or "PMD" 3) coupled to an embedded controller (EC/KBC 11) of the notebook. EC/KBC 11 functions as a keyboard controller of the notebook. PMD 3 is also coupled by a USB (universal serial bus) to PC chipset 9 of the notebook.

FIG. 1 is a block diagram of notebook computer ("notebook") 1 which includes conventional PC chipset 9 (including a CPU which runs notebook 1's operating system software when notebook 1 has been booted up into its fully-powered normal operating mode), graphics chipset 15, main display 17, keyboard 13, and embedded controller (EC/KBC 11), connected as shown. EC/KBC 11 is of a conventional type which functions as a keyboard controller. As shown, EC/KBC 11 is coupled to chipset 9 by a conventional low pin count ("LPC") bus, but in alternative implementations is coupled to chipset 9 by other means (e.g., by a conventional ISA bus or other bus). EC/KBC 11 is also coupled to keyboard 13 (e.g., by a conventional 26-pin cable) and typically also to other elements (not shown in FIG. 1) of notebook 1.

Notebook 1 also includes an auxiliary display subsystem (personal media display system 3, to be referred to as "PMD" 3), which includes microprocessor 5 ("auxiliary processor" 5), auxiliary display 7 (coupled to and driven by microprocessor 5), and typically also other elements (to be described below). Microprocessor 5 is coupled by an SMB to embedded controller (EC/KBC) 11 for communication with EC/KBC 11 when EC/KBC 11 is conventionally configured to operate as an SMB host. Microprocessor 5 is coupled by a conventional USB (universal serial bus) to PC chipset 9 for communication with PC chipset 9. Typically, microprocessor 5 communicates with EC/KBC 11 over the SMB when chipset 9 is in a low-power state (e.g., a standby or hibernation state) or when chipset 9 is fully awake (and in a state in which it consumes full power), and microprocessor 5 communicates with chipset 9 over the USB when chipset 9 is fully awake (and in a state in which it consumes full power).

Notebook 1 typically includes elements (not shown in FIG. 1) in addition to those shown in FIG. 1. For example, it can include a smart battery (coupled to EC/KBC 11 by an SMB) and a smart battery charger (also coupled to EC/KBC 11 by an SMB).

PMD 3 typically also includes other elements (not shown in FIG. 1). For example, PMD 3 typically includes input devices (e.g., control buttons and a biometric sensor) and a memory. PMD 3 is typically configured to cache data received from other elements of notebook 1 as a result of communication over the USB between microprocessor 5 and PC chipset 9. PMD 3 is typically configured to display such cached data (in the case that the cached data are video or other image data) on auxiliary display 7 and to play back the cached data (in the case that the cached data are audio data) on loudspeakers (not shown) of notebook 1. PMD 3 is typically also configured to display (on auxiliary display 7) system status data received by microprocessor 5 from EC/KBC 11 over the SMB.

Examples of system status data that can be received by PMD 3 (e.g., for display on auxiliary display 7) from the non-PMD portion of notebook 1 (e.g., from EC/KBC 11 as described below) include indications that notebook 1 is on, off, shutting down, or powering up, indications that notebook 1 is in a standby, suspended, or hibernation state, indications that a battery of notebook 1 is charging or discharging, indications of the charge level of a battery of notebook 1, low battery alarms, indications that communication with the non-PMD portion of notebook 1 is in progress, notifications that the non-PMD portion of notebook 1 has received new email, and current time and date updates.

PMD 3 can also be configured to perform, while PC chipset 9 is in a standby or other low-power state, other functions (e.g., answering incoming telephone calls) that other elements of notebook 1 could perform if notebook 1 were in a fully-powered, normal operating state. When PC chipset 9 is in a low-power state, other major power-consuming elements of notebook 1 (e.g., main display 17) are typically off or in a standby or other low-power state so that notebook 1 as a whole is in a low-power state. Preferably, microprocessor 5 and other elements of PMD 3 are implemented to consume less power (preferably, much less power) than consumed by the elements of notebook 1 other than PMD 3 in a fully-powered, normal operating state. Thus, a user can employ PMD 3 to conserve power while performing useful functions of notebook 1 (while notebook 1 is in a low-power state), without the need to cause notebook 1's CPU (implemented by PC chipset 9) to boot up (which would typically consume significant time).

Functions that can be performed by various embodiments of PMD 3 include cached music file playing (with optional equalization, sample rate conversion, or other audio post processing), display of cached picture slide shows (e.g., on auxiliary display 7), display of world clock, time, and date information, stop watch functionality, display of contact lists, email, reminder memos, timed memos, task lists, battery and other information regarding notebook 1 and users thereof (e.g., user name and information, system information, manufacturer, serial number and model number, OEM support, technical contact information, and logos), password/screen lock support functions, system functions (e.g., placing notebook in an on, off, hibernation, standby, or suspend state), and lid-closed notebook system and application control functions.

Figure 2:
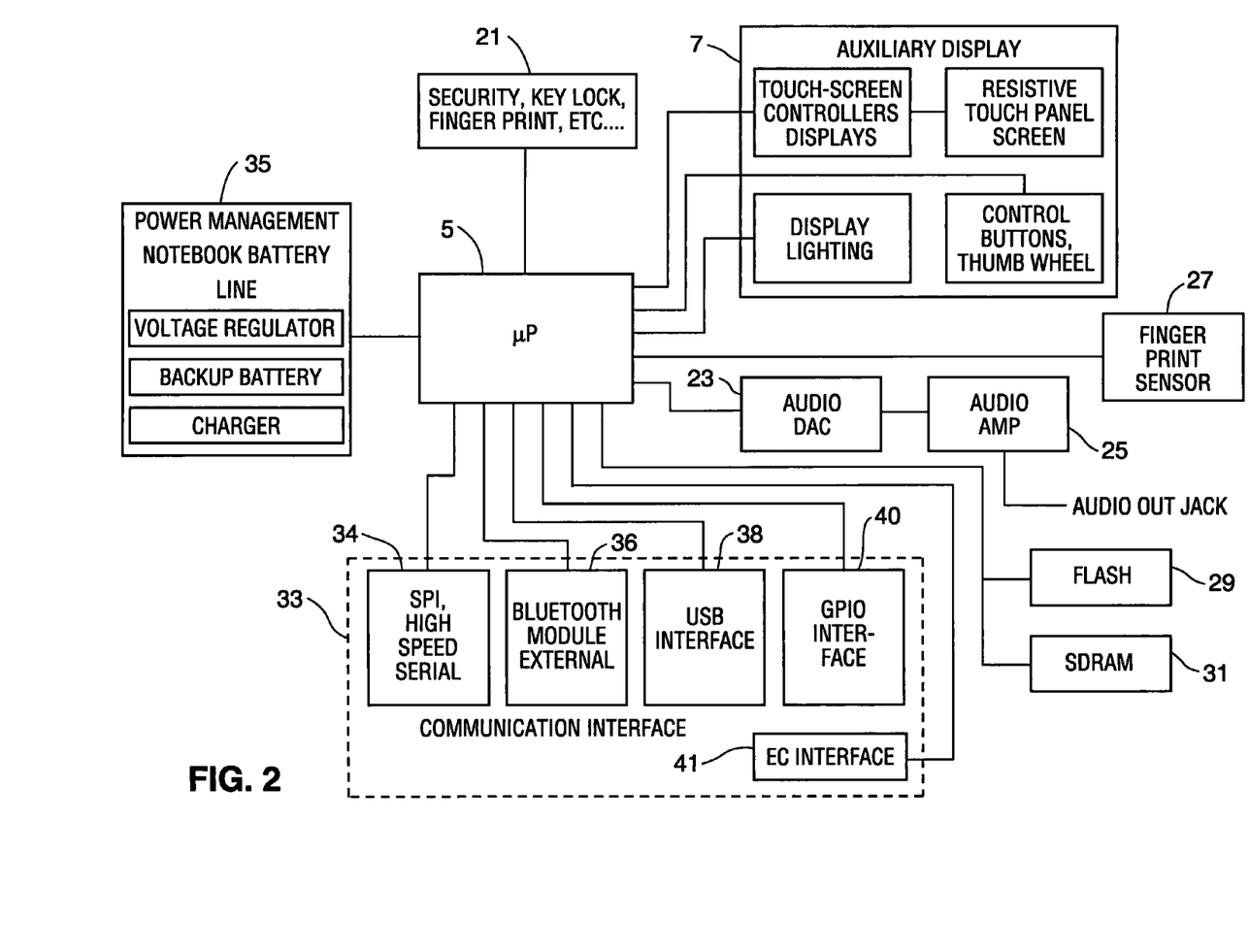
FIG. 2 is a block diagram of a typical implementation of PMD 3 of FIG. 1.

FIG. 2 is a block diagram of a typical implementation of PMD 3 of FIG. 1. In the FIG. 2 implementation, microprocessor 5 is a dual core, ARM-based microprocessor implemented to consume low power (e.g., to operate for 50 hours on power drawn from an AA battery), auxiliary display 7 includes touch-screen controller, a resistive touch panel screen, display lighting, and control buttons and a thumb wheel, connected as shown. Typically, when notebook 1 has the size and physical form of a conventional notebook computer (and thus includes a keyboard section and a cover attached by hinges to the keyboard section, with the main display installed to be visible from the cover's front surface), PMD 3 is installed in the notebook computer's cover with the touch panel screen, control buttons, and thumb wheel of auxiliary display 7 accessible from the cover's back surface (so as to be accessible when the cover's front surface is folded against the keyboard section to protect the main display).

In the FIG. 2 implementation, PMD 3 includes communication interface subsystem 33 (coupled to microprocessor 5), which can include high speed serial interface 34, Bluetooth module 36, USB interface 38 (configured to be coupled by USB conductors to PC chipset 9), GPIO interface 40, and EC interface 41 (configured to be coupled by SMB conductors to EC/KBC 11), and other interface circuitry (e.g., RF, 802.11, Ethernet, and/or IR interface circuitry). In the FIG. 2 implementation, microprocessor 5 includes an internal boot block ROM (not separately shown), and PMD 3 includes NOR/NAND flash memory 29 and SRAM/SDRAM 31, security input device 21 (e.g., a key lock), audio DAC 23, and fingerprint sensor 27, all coupled to microprocessor 5. Audio amplifier 25 is coupled to the output of DAC 23 for amplifying the analog audio that is output from DAC 23, and amplifier 25 can drive speakers which are external to PMD 3 (e.g., headphones plugged into a connector of PMD 3).

Fingerprint sensor 27 is used to authenticate users of PMD 3, using user identity data cached in memory (e.g., memory 29 or 31) of PMD 3. When typically programmed, PMD 3 can be placed in a locked state in which it can be unlocked by an authorized user only after PMD 3 successfully authenticates the user (even while notebook 1 is in a standby state or other low-power state, and without waking up notebook 1) including by comparing user biometric data (e.g., a fingerprint) with cached biometric data.

In the FIG. 2 implementation, PMD 3 also includes analog power management circuitry 35 coupled to microprocessor 5. Circuitry 35 includes at least one voltage regulator (e.g., voltage regulators for regulating each of a 2.9 Volt digital supply voltage, a 2.9 Volt analog supply voltage, a peripheral supply voltage in the range 1.7 to 3.3 Volts, an RTC supply voltage in the range 1 Volt to 2.5 Volts, and a 3.26 Volt USB transceiver voltage), a battery charger, a backup battery, and a DC-to-DC converter for providing a 3.2 or 3.4 V output in response to an input voltage in the range from 1.0 Volt to 3.3 Volts.

PMD 3 is typically configured to cache (e.g., in memory 29 and/or memory 31) data received from other elements of notebook 1 as a result of communication over the USB between microprocessor 5 and PC chipset 9. PMD 3 is typically configured to display such cached data (in the case that the cached data are video or other image data) on auxiliary display 7 and to play back the cached data (in the case that the cached data are audio data) on loudspeakers (not shown) of notebook 1. PMD 3 is typically also configured to display (on auxiliary display 7) system status data received by microprocessor 5 from EC/KBC 11 over the SMB. Microprocessor 5 (and other elements of PMD 3) can also be configured to implement digital rights management (e.g., to decrypt content received from elements of notebook 1 external to PMD 3, and to store, in read-only memory, unique identification data for digital rights management algorithms).

PMD 3 is typically also configured to perform one or more of the following functions:

provide low power, instant access to music and multimedia content cached in memory (e.g., memory 29 and/or memory 31) of PMD 3 and other information (e.g., critical information) cached in memory of PMD 3 (e.g., frequently used information transferred from other elements of notebook 1 and cached in PMD 3 before notebook 1 enters a standby or other low-power state);

allow a user to control notebook 1 with the cover of main display 17 closed (e.g., by waking up notebook 1 and controlling notebook 1 by actuating controls on or associated with auxiliary display 7, while main display 17 is covered and thus protected and unavailable); and provide other functionality such as generating alarms (e.g., for elapsed time or scheduled events, or low battery alarms indicating that notebook 1's battery is nearly discharged), implementing user authentication (or other security functions) preliminary to booting of notebook 1's CPU, collecting and monitoring system diagnostics data (e.g., data indicating whether notebook 1 is shutting down, powering up, whether notebook 1 is in an on, off, standby, suspended, or hibernation state, whether notebook 1's battery is charging/discharging, and the charge level of notebook 1's battery), and communicating with notebook 1's operating system software regarding system power management policies.

Microprocessor 5 is preferably programmed with firmware for executing appropriate functions and with software for executing functions including the following: boot block (e.g., for initializing microprocessor 5's CPU and PMD 3's flash memory 29 and other memory, authenticating a firmware boot loader in PMD 3's flash memory 29, and loading and executing a firmware boot loader), boot loader support (stored in PMD 3's flash memory 29, for authenticating firmware and device drivers and executing firmware), firmware kernel, file system, graphic tool kit, and drivers (e.g., USB, SMB, I2S, display controller, touch screen, and JTAG debugger support).

Several elements of the FIG. 2 implementation of PMD 3 (e.g., microprocessor 5 and circuitry 23, 25, and 35) can be and preferably are integrated in a single chip.

Any device on an SMB has a unique 7-bit address. In a conventional notebook architecture, the embedded controller which functions as keyboard controller (e.g., EC/KBC 11 of FIG. 1) is conventionally assigned SMB host device address 0001_000b.

In a class of implementations of FIG. 1, microprocessor 5 is assigned SMB device address 1000_101b as a default address for receiving messages over the SMB, and embedded controller (EC/KBC) 11 is assigned SMB host device address 0001_000b for receiving messages over the SMB. Preferably, notebook 1 is implemented so that if another device with the address 1000_101b is connected to the same SMB segment as is microprocessor 5, the default address for microprocessor 5 can be reprogrammed in firmware.

Typical SMB messages sent from microprocessor 5 (an SMB device acting as bus master) to EC/KBC 11 (an SMB host controller acting as bus slave) include data requests and action requests of any of the types described below.

In some embodiments, microprocessor 5 (an SMB device acting as bus master) sends messages to EC/KBC 11 (an SMB host controller acting as bus slave) in accordance with the SMB host notify protocol described in the above-cited SMB specification. In accordance with this protocol, the SMB device master can send to the SMB host controller (functioning as an SMB slave) 16-bit messages (each preceded by two 8-bit words that indicate the target and sending device addresses, with transmission of each 8-bit word followed by an "acknowledge" bit) in the following format:

| 1 | 7 | 1 | 1 | 7 | 1 | 1 | 8 | 1 | 8 | 1 | 1 |
|---|---|---|---|---|---|---|---|---|---|---|---|
| S | Target Address | Wr | A | Sending Device Address | A | | Data Byte Low | A | Data Byte High | A | P |
| | SMB Host Address | 0 | 0 | PMD Address | 0 | 0 | Command | 0 | Sub-Command | 0 | |

In the previous paragraph, "S" denotes the conventional SMB "start condition" which the transmitter of the message (the SMB device master) must assert on the SMB to indicate the start of transmission of a message comprising a number of 8-bit packets separated by "acknowledge" bits, "Wr" denotes a command bit (whose bit value is 0 during transmission in accordance with the host notify protocol), "A" denotes an acknowledge bit (whose value is 0 for an ACK and 1 for a NACK), "P" denotes the conventional SMB "stop condition"

which the message transmitter asserts on the SMB to indicate the end of transmission of a message, and the two 8-bit words "Data Byte Low" and "Data Byte High" are the body of the message. The 8-bit sending device address indicates to the message recipient (the SMB host controller slave) the origin of the message.

Depending on the command field value (the above-indicated 8-bit word "Data Byte Low"), all messages from microprocessor 5 to EC/KBC 11 can be divided into two categories: data requests and action requests.

In some embodiments, data requests (asserted from microprocessor 5 to EC/KBC 11) have the format indicated in Tables 1 and 2 below. Table 1 indicates the format of each data request's command field value (the above-indicated 8-bit word "Data Byte Low"), and Table 2 indicates the format of each data request's sub-command field value (the above-indicated 8-bit word "Data Byte High") and bits 3:0 of the data request's command field.

TABLE 1

Data Request Commands

| Command Field Bit(s) | Description |
|---|---|
| 7:5 | Requestor Tag<br>000b - Invalid<br>Others - Assigned by microprocessor 5 (no context for EC/KBC 11) |
| 4 | Message Type<br>0b - Data Request |
| 3:0 | Command Code<br>0h - EC Capabilities<br>1h - System Status<br>2h - Battery Information<br>Others - Reserved |

TABLE 2

Data Request Sub-Commands

| Command Field Bits 3:0 | Sub-Command Field Bit(s) | Description |
|---|---|---|
| 0h | 7:0 | Reserved (00h) |
| 1h | 7:0 | Reserved (00h) |
| 2h | 7:4 | Battery Slot Tag<br>0h - Battery Slot 0<br>1h - Battery Slot 1<br>2h - Battery Slot 2<br>3h - Battery Slot 3<br>Others - Reserved |
|  | 3:0 | Battery Information<br>0h - Battery Slot Status and Capacity Gauge<br>1h - Battery Voltage<br>2h - Battery Remaining Time to Empty<br>3h - Battery Charging/Discharging Rate<br>4h - Battery Remaining Capacity<br>5h - Battery Last Full Charge Capacity<br>6h - Battery Design Capacity<br>7h-Bh - Reserved<br>Ch - Battery Manufacturer Name<br>Dh - Battery Model<br>Eh - Battery Type<br>Fh - Reserved |

In accordance with some embodiments, action requests (asserted from microprocessor 5 to EC/KBC 11) have the format indicated in Tables 3 and 4 below. Table 3 indicates the format of each action request's command field value (the above-indicated 8-bit word "Data Byte Low"), and Table 4 indicates the format of each action request's sub-command field value (the above-indicated 8-bit word "Data Byte High") and bits 3:0 of the action request's command field.

TABLE 3

Action Request Commands

| Command Field Bit(s) | Description |
|---|---|
| 7:5 | Requestor Tag<br>000b - Invalid<br>Others - Assigned by microprocessor 5 (no context for EC/KBC 11) |
| 4 | Message Type<br>1b - Action Request |
| 3:0 | Command Code<br>0h - EC/KBC GPIO Control<br>1h - System Sleep State control<br>2h - Generate System Wake Event<br>3h - Generate System Run Time Event<br>Others - Reserved |

TABLE 4

Action Request Sub-Commands

| Command Field Bits 3:0 | Sub-Command Field Bit(s) | Description |
|---|---|---|
| 0h | 7:6 | Reserved (00b) |
|  | 5:4 | Requested GPIO state<br>00b - Output Low<br>01b - Output High<br>1Xb - Input |
|  | 3:0 | EC/KBC GPIO number (mapping of this number to EC/KBC 11's physical GPIO is preferably done by EC/KBC firmware)<br>00h-0Fh - GPIO0-GPIO15 |
| 1h | 7:0 | Requested System Sleep State<br>00h - Invalid<br>01h - ACPI S1 state (Standby)<br>02h - ACPI S2 State<br>03h - ACPI S3 State (Suspend to RAM)<br>04h - ACPI S4 State (Suspend to Disk, Hibernation)<br>05h - ACPI S5 State (System is Off)<br>06h - User defined state (emulate power/sleep button event)<br>Others - Reserved |
| 2h | 7:0 | PMD Wake Event ID reported by EC/KBC 11 to PC chipset 9 of notebook 1<br>00h-FFh - ID0-ID255 |
| 3h | 7:0 | PMD Run Time Event ID reported by EC/KBC 11 to PC chipset 9 of notebook 1<br>00h-FFh - ID0-ID255 |

In Tables 3 and 4, "GPIO" denotes "general purpose input/output." Action requests having the values indicated in Tables 3 and 4 in their command and sub-command fields can be asserted over the SMB to EC/KBC 11 to cause EC/KBC 11 to assert values (indicated by the messages) on specific GPIO pins of EC/KBC 11 (indicated by the messages) to control other elements of the notebook. The GPIO connections (to the elements of the notebook to be controlled) could be of a type present in a conventional notebook, but they are controlled in some embodiments of the present invention by action requests asserted from PMD 3 over an SMB (or another serial bus, in alternative embodiments) to EC/KBC 11 (or another embedded controller). For example (in one embodiment), microprocessor 5 of PMD 3 could assert action request messages over the SMB of FIG. 1 (or FIG. 3) to EC/KBC 11 to cause EC/KBC 11 to assert control bits (indicated by the messages) on specific GPIO lines (also indicated by the messages) to an audio amplifier of the notebook, where such amplifier (not shown in the Figures) is coupled in a conventional manner to EC/KBC 11 by such GPIO lines.

In variations on the notebook of FIG. 1, action requests of the described type could be asserted over an SMB to a keyboard controller ("KBC") in a keyboard ("KB"), or similar action requests could be asserted over another two-wire serial bus to a KBC in a KB, from a microprocessor of an auxiliary display subsystem to control the KBC. The KBC could also be coupled by another two-wire serial bus to an embedded controller (EC) so that either the EC or the microprocessor of the auxiliary display subsystem could control the KBC over the two-wire serial bus (thereby eliminating the need for a 26-wire cable or other bulky cable between the KBC, external to the KB but possibly internal to an EC, and the KB).

We next describe messages sent over the SMB from EC/KBC 11 (an SMB host controller acting as bus master) to microprocessor 5 (an SMB device acting as bus slave). In some embodiments, the SMB write block protocol with the following format is used for all messages sent over the SMB from EC/KBC 11 (acting as bus master) to microprocessor 5. In accordance with this protocol, the SMB host controller master can send to microprocessor 5 (functioning as an SMB slave) N*8-bit messages (where N is an integer), each preceded by three 8-bit words that indicate microprocessor 5's address, a data report command, and a message byte count (indicative of the value of N), with transmission of each 8-bit word followed by an "acknowledge" bit) in the following format:

the sub-command field of the Data Report Message), and the second byte of each N-byte message being a Report Status byte. A non-zero value of the Report Status byte indicates report failure. If the Report Status byte has a zero value, the report data transferred in the subsequent bytes of the message provide system information according to the command and sub-command fields.

The command byte transmitted following the address byte is sometimes denoted herein as the Command field of the Data Report Message. The content of the Command and Sub-Command fields of Data Report Messages from EC/KBC 11 is summarized in Table 5 and Table 6 below.

TABLE 5

Data Report Commands

| Command Field Bit(s) | Description |
|---|---|
| 7:5 | Requestor Tag<br>000b - No requestor (message initiated by EC/KBC 11 itself)<br>Others - Same as in the PMD data request which triggered the report (used internally by microprocessor 5 to properly route the report) |
| 4 | Message Type<br>0b - Data Report |
| 3:0 | Command Code<br>0h - EC Capabilities<br>1h - System Status<br>2h - Battery Information<br>Others - Reserved |

| 1 | 7 | 1 | 1 | 8 | 1 | 8 | 1 | 8 | 1 | |
|---|---|---|---|---|---|---|---|---|---|---|
| S | Slave Address<br>PMD Address | Wr<br>0 | A<br>0 | Command<br>Data Report Command | A<br>0 | Byte Count<br>N (2-32) | A<br>0 | Data Byte 1<br>Sub-Command | A<br>0 | ... |

| 8 | 1 | 8 | 1 | | 8 | 1 | 8 | 1 | 1 |
|---|---|---|---|---|---|---|---|---|---|
| Data Byte 2<br>Report Status | A<br>0 | Data Byte 3<br>Report Data | A<br>0 | ... | Data Byte N<br>Report Data | A<br>0 | PEC[1] | A<br>0 | P |

In the previous paragraph, "S" denotes the conventional SMB "start condition" which the transmitter of the message (the SMB host controller acting as bus master) must assert on the SMB to indicate the start of transmission of a message comprising a number of 8-bit packets separated by "acknowledge" bits, "Wr" denotes a command bit (whose bit value is 0 during transmission in accordance with the write block protocol), "A" denotes an acknowledge bit (whose value is 0 for an ACK and 1 for a NACK), "PEC" is a Packet Error Code, "P" denotes the conventional SMB "stop condition" which the message transmitter asserts on the SMB to indicate the end of transmission of a message, and the N 8-bit words "Data Byte" are the body of the message. The 7-bit slave address is the address of microprocessor 5. The Packet Error Code (PEC) byte is an optional CRC-8 error checking byte, and if included, it is appended after the last Data Byte of the message body and its usage is consistent with the PEC support bit included in an EC Capabilities Report (see Table 8 below).

Messages having the above-described format that are sent over the SMB from EC/KBC 11 (acting as bus master) to microprocessor 5 (acting as bus slave) are Data Report messages (each comprising N bytes that follow three initial address, command, and message byte count bytes), with the first byte of each N-byte message being a sub-command (i.e.,

TABLE 6

Data Report Sub-Commands

| Command Field Bits 3:0 | Sub-Command Field Bit(s) | Description |
|---|---|---|
| 0h | 7:0 | Reserved (00h) |
| 1h | 7:0 | Reserved (00h) |
| 2h | 7:4 | Battery Slot Tag<br>0h - Battery Slot 0<br>1h - Battery Slot 1<br>2h - Battery Slot 2<br>3h - Battery Slot 3<br>Others - Reserved |
| | 4:0 | Battery Information<br>0h - Battery Slot Status and Capacity Gauge<br>1h - Battery Voltage<br>2h - Battery Remaining Time to Empty<br>3h - Battery Charging/Discharging Rate<br>4h - Battery Remaining Capacity<br>5h - Battery Last Full Charge Capacity<br>6h - Battery Design Capacity<br>7h-Bh - Reserved<br>Ch - Battery Manufacturer Name |

TABLE 6-continued

Data Report Sub-Commands

| Command Field Bits 3:0 | Sub-Command Field Bit(s) | Description |
|---|---|---|
| | | Dh - Battery Model |
| | | Eh - Battery Type |
| | | Fh - Reserved |

The Command and Sub-Command fields for each Data Report message from EC/KBC 11 are the same as the respective fields in the above-described data requests from microprocessor 5 with one exception: a "no requestor" tag can be specified if a Data Report is initiated by EC/KBC 11 itself (and is not a response to a data request from microprocessor 5).

Table 7 specifies values of the Report Status byte (the above-described second byte) of each N-byte Data Report message, and allowable Byte Count values that correspond to each value of the Report Status byte.

TABLE 7

Data Report Status and Byte Count

| Report Status | Byte Count | Description |
|---|---|---|
| 00h | 3-32 | Report Successful. Following the Report Status byte, at least one data byte is, and as many as 30 data bytes are, returned according to the command and subcommand fields |
| 01h | 2 | Report Failed: attempt to access unsupported battery slot, or access to empty slot. A Battery Slot Status report must be returned successfully even for an empty slot. The "battery present flag" should be cleared in this case. |
| 02h | 2 | Report Failed: unknown data |
| 0FFh | 2 | Report Failed: any other reason than described above |
| Others | 2 | Reserved |

No data is reported by failed report (no data bytes follow a Report Status byte having a non-zero value). Data fields for all successful Data Reports from EC/KBC 11 are defined below (the requestor tag for all report examples below is set to 001b).

Table 8 specifies value for the Command and Sub-command fields, Byte Count and Report Status bytes, and data bytes of an "EC Capabilities" Data Report message (indicated in Tables 1 and 5 above).

TABLE 8

EC Capabilities Data Report

| SMB Protocol Byte | Value | Note |
|---|---|---|
| Command Byte | 20h | |
| Byte Count | 08h | |
| Data Byte 1 (Sub-Command) | 00h | |
| Data Byte 2 (Report Status) | 00h | Successful |
| Data Byte 3 | Version Number (10h = version 1.0) | Indicates the specification version with which EC/KBC 11 is compliant (the major version is specified in the high nibble, the minor version in the low nibble) |
| Data Byte 4 | GPIO allocation | Number of GPIO pins of EC/KBC 11 that are allocated for PMD control (up to 16) |
| Data Byte 5 | Battery System Configuration | See Table 9 |
| Data Byte 6 | Supported System Sleep States | See Table 10 |
| Data Byte 7 | Reserved (00h) | |
| Data Byte 8 | Reserved (00h) | |

TABLE 9

Battery System Configuration

| Battery System Configuration Bit(s) | Description |
|---|---|
| 7:5 | Reserved (000b) |
| 4 | PEC Support bit<br>0b - EC/KBC messages to microprocessor 5 do not use a protocol with PEC<br>1b - EC/KBC messages to microprocessor 5 use a protocol with PEC |
| 3:0 | Number Battery Slots (maximum number of batteries in the system)<br>0h - Invalid<br>1h - One Battery Slot 0<br>2h - Two Battery Slots 1 and 2<br>3h - Three Battery Slots 0, 1 and 2<br>4h - Four Battery Slots 0, 1, 2 and 3<br>Others - Reserved |

TABLE 10

System Sleep States Support

| System Sleep Sate Support Bit(s) | Description |
|---|---|
| 7 | Reserved (0b) |
| 6 | User defined state (emulate power/sleep button event) |
| 5 | ACPI S5 state (System is Off) |
| 4 | ACPI S4 state (Suspend to Disk, Hibernation) |
| 3 | ACPI S3 state (Suspend to RAM) |
| 2 | ACPI S2 state |
| 1 | ACPI S1 state (Standby)<br>0b - Sleep state is not supported<br>1b - Sleep state is supported |
| 0 | Reserved (0b) |

Table 11 specifies value for the Command and Sub-command fields, Byte Count and Report Status bytes, and data bytes of a "System Status" Data Report message (indicated in Tables 1 and 5 above).

TABLE 11

System Status Report

| SMB Protocol Byte | Value | Note |
|---|---|---|
| Command Byte | 21h | |
| Byte Count | 08h | |
| Data Byte 1 (Sub-Command) | 00h | |

TABLE 11-continued

System Status Report

| SMB Protocol Byte | Value | Note |
|---|---|---|
| Data Byte 2 (Report Status) | 00h | Successful |
| Data Byte 3 | System State Bits 7-0 | See Table 12 |
| Data Byte 4 | System State Bits 15-8 | See Table 12 |
| Data Byte 5 | GPIO State Bits 7-0 | Each bit 15-0 returns the state of the respective GPIO pin, GPIO15-GPIO0. Non supported GPIOs should be reported as "0." |
| Data Byte 6 | GPIO State Bits 15-8 | |
| Data Byte 7 | Reserved (00h) | |
| Data Byte 8 | Reserved (00h) | |

TABLE 12

System State Flags

| System State Bit(s) | Description |
|---|---|
| 15 | Battery in Slot 3 Present |
| 14 | Battery in Slot 2 Present |
| 13 | Battery in Slot 1 Present |
| 12 | Battery in Slot 0 Present<br>0b - Battery is not present in the respective Slot<br>1b - Battery is present in the respective Slot |
| 11:6 | Reserved (000000b) |
| 5 | LID State<br>0b - LID closed<br>1b - LID open |
| 4 | AC Present<br>0b - No AC (Battery Power)<br>1b - AC Present |
| 3:0 | System Power State<br>0h - ACPI S0 state (System is On)<br>1h - ACPI S1 state (Standby)<br>2h - ACPI S2 State<br>3h - ACPI S3 State (Suspend to RAM)<br>4h - ACPI S4 State (Suspend to Disk, Hibernation)<br>5h - ACPI S5 State (System is Off)<br>Others - Reserved |

Table 13 specifies value for the Command and Sub-command fields, Byte Count and Report Status bytes, and data bytes of a "Battery Information" Data Report message (indicated in Tables 1 and 5 above) of the "Slot Status and Capacity Gauge" type (indicated in Table 6 above).

TABLE 13

Battery Information (Slot Status and Capacity Gauge) Report

| SMB Protocol Byte | Value | Note |
|---|---|---|
| Command Byte | 22h | |
| Byte Count | 04h | |
| Data Byte 1 (Sub-Command) | X0h | X = 0h for Battery in Slot 0<br>X = 1h for Battery in Slot 1<br>X = 2h for Battery in Slot 2<br>X = 3h for Battery in Slot 3 |
| Data Byte 2 (Report Status) | 00h | Successful |
| Data Byte 3 | Battery Slot Status | See Table 14 |
| Data Byte 4 | Battery Capacity Gauge | Battery's relative remaining capacity in % |

TABLE 14

Battery Slot Status

| Status Bit(s) | Description |
|---|---|
| 7:5 | Reserved (000b) |
| 4 | Discharging Alarm<br>0b - No alarm<br>1b - Alarm is set |
| 3 | Charging Alarm<br>0b - No alarm<br>1b - Alarm is set |
| 2:1 | Charging state<br>00b - Battery is idle (self-discharging)<br>01b - Battery is being charged<br>10b - Battery is being discharged (powering the system)<br>11b - Reserved |
| 0 | Present State<br>0b - Battery is not present in the respective slot<br>1b - Battery is present in the respective slot |

Table 15 specifies value for the Command and Sub-command fields, Byte Count and Report Status bytes, and data bytes of a "Battery Information" Data Report message (indicated in Tables 1 and 5 above) of the "Battery Voltage" type (indicated in Table 6 above).

TABLE 15

Battery Voltage Report

| SMB Protocol Byte | Description | Note |
|---|---|---|
| Command Byte | 22h | |
| Byte Count | 04h | |
| Data Byte 1 (Sub-Command) | X1h | X = 0h for Battery in Slot 0<br>X = 1h for Battery in Slot 1<br>X = 2h for Battery in Slot 2<br>X = 3h for Battery in Slot 3 |
| Data Byte 2 (Report Status) | 00h | Successful |
| Data Byte 3 | Present Voltage Bits 7-0 | Battery's present voltage (16-bit unsigned value, in [mV]) |
| Data Byte 4 | Present Voltage Bits 15-8 | |

Table 16 specifies value for the Command and Sub-command fields, Byte Count and Report Status bytes, and data bytes of a "Battery Information" Data Report message (indicated in Tables 1 and 5 above) of the "Battery Remaining Time to Empty" type (indicated in Table 6 above).

TABLE 16

Battery Remaining Time to Empty Report

| SMB Protocol Byte | Description | Note |
|---|---|---|
| Command Byte | 22h | |
| Byte Count | 04h | |
| Data Byte 1 (Sub-Command) | X2h | X = 0h for Battery in Slot 0<br>X = 1h for Battery in Slot 1<br>X = 2h for Battery in Slot 2<br>X = 3h for Battery in Slot 3 |
| Data Byte 2 (Report Status) | 00h | Successful |
| Data Byte 3 | Time to Empty Bits 7-0 | Estimated remaining time to empty for discharging battery at present rate (in [min]) Report 0FFFFh if battery is not discharging |
| Data Byte 4 | Time to Empty Bits 15-8 | |

Table 17 specifies value for the Command and Sub-command fields, Byte Count and Report Status bytes, and data bytes of a "Battery Information" Data Report message (indicated in Tables 1 and 5 above) of the "Battery Charging/Discharging Rate" type (indicated in Table 6 above).

TABLE 17

Battery Charging/Discharging Rate Report

| SMB Protocol Byte | Description | Note |
|---|---|---|
| Command Byte | 22h | |
| Byte Count | 06h | |
| Data Byte 1 (Sub-Command) | X3h | X = 0h for Battery in Slot 0<br>X = 1h for Battery in Slot 1<br>X = 2h for Battery in Slot 2<br>X = 3h for Battery in Slot 3 |
| Data Byte 2 (Report Status) | 00h | Successful |
| Data Byte 3 | Rate Bits 7-0 | Battery's charging/discharging rate |
| Data Byte 4 | Rate Bits 15-8 | (24-bit unsigned value in specified |
| Data Byte 5 | Rate Bits 23-16 | Rate Units; direction is reported in Slot Status). |
| Data Byte 6 | Rate Units | 00h = [mW]<br>01h = [mA]<br>02h = [10 mW] |

Table 18 specifies value for the Command and Sub-command fields, Byte Count and Report Status bytes, and data bytes of a "Battery Information" Data Report message (indicated in Tables 1 and 5 above) of the "Battery Remaining Capacity" type (indicated in Table 6 above).

TABLE 18

Battery Remaining Capacity

| SMB Protocol Byte | Description | Note |
|---|---|---|
| Command Byte | 22h | |
| Byte Count | 06h | |
| Data Byte 1 (Sub-Command) | X4h | X = 0h for Battery in Slot 0<br>X = 1h for Battery in Slot 1<br>X = 2h for Battery in Slot 2<br>X = 3h for Battery in Slot 3 |
| Data Byte 2 (Report Status) | 00h | Successful |
| Data Byte 3 | Capacity Bits 7-0 | Battery's remaining capacity |
| Data Byte 4 | Capacity Bits 15-8 | (24-bit unsigned value in |
| Data Byte 5 | Capacity Bits 23-16 | specified Capacity Units) |
| Data Byte 6 | Capacity Units | 00h = [mWh]<br>01h = [mAh]<br>02h = [10 mWh] |

Table 19 specifies value for the Command and Sub-command fields, Byte Count and Report Status bytes, and data bytes of a "Battery Information" Data Report message (indicated in Tables 1 and 5 above) of the "Battery Last Full Charge Capacity" type (indicated in Table 6 above).

TABLE 19

Battery Last Full Charge Capacity

| SMB Protocol Byte | Description | Note |
|---|---|---|
| Command Byte | 22h | |
| Byte Count | 06h | |
| Data Byte 1 (Sub-Command) | X5h | X = 0h for Battery in Slot 0<br>X = 1h for Battery in Slot 1<br>X = 2h for Battery in Slot 2<br>X = 3h for Battery in Slot 3 |
| Data Byte 2 (Report Status) | 00h | Successful |
| Data Byte 3 | Capacity Bits 7-0 | Battery's capacity when fully |

TABLE 19-continued

Battery Last Full Charge Capacity

| SMB Protocol Byte | Description | Note |
|---|---|---|
| Data Byte 4 | Capacity Bits 15-8 | charged last time (24-bit |
| Data Byte 5 | Capacity Bits 23-16 | unsigned value in specified Capacity Units) |
| Data Byte 6 | Capacity Units | 00h = [mWh]<br>01h = [mAh]<br>02h = [10 mWh] |

Table 20 specifies value for the Command and Sub-command fields, Byte Count and Report Status bytes, and data bytes of a "Battery Information" Data Report message (indicated in Tables 1 and 5 above) of the "Battery Design Capacity" type (indicated in Table 6 above).

TABLE 20

Battery Design Capacity

| SMB Protocol Byte | Description | Note |
|---|---|---|
| Command Byte | 22h | |
| Byte Count | 06h | |
| Data Byte 1 (Sub-Command) | X6h | X = 0h for Battery in Slot 0<br>X = 1h for Battery in Slot 1<br>X = 2h for Battery in Slot 2<br>X = 3h for Battery in Slot 3 |
| Data Byte 2 (Report Status) | 00h | Successful |
| Data Byte 3 | Capacity Bits 7-0 | Battery's design (24-bit |
| Data Byte 4 | Capacity Bits 15-8 | unsigned value in specified |
| Data Byte 5 | Capacity Bits 23-16 | Capacity Units) |
| Data Byte 6 | Capacity Units | 00h = [mWh]<br>01h = [mAh]<br>02h = [10 mWh] |

Table 21 specifies value for the Command and Sub-command fields, Byte Count and Report Status bytes, and data bytes of a "Battery Information" Data Report message (indicated in Tables 1 and 5 above) of the "Battery Manufacturer" type (indicated in Table 6 above).

TABLE 21

Battery Manufacturer Report

| SMB Protocol Byte | Description | Note |
|---|---|---|
| Command Byte | 22h | |
| Byte Count | N = 03h-20h | |
| Data Byte 1 (Sub-Command) | XCh | X = 0h for Battery in Slot 0<br>X = 1h for Battery in Slot 1<br>X = 2h for Battery in Slot 2<br>X = 3h for Battery in Slot 3 |
| Data Byte 2 (Report Status) | 00h | Successful |
| Data Byte 3- Data Byte N | ASCII string | Manufacturer name is up to 30 characters (may not be null-terminated) |

Table 22 specifies value for the Command and Sub-command fields, Byte Count and Report Status bytes, and data bytes of a "Battery Information" Data Report message (indicated in Tables 1 and 5 above) of the "Battery Model" type (indicated in Table 6 above).

TABLE 22

Battery Model Report

| SMB Protocol Byte | Description | Note |
|---|---|---|
| Command Byte | 22h | |
| Byte Count | N = 03h-20h | |
| Data Byte 1 (Sub-Command) | XDh | X = 0h for Battery in Slot 0 |
| | | X = 1h for Battery in Slot 1 |
| | | X = 2h for Battery in Slot 2 |
| | | X = 3h for Battery in Slot 3 |
| Data Byte 2 (Report Status) | 00h | Successful |
| Data Byte 3- Data Byte N | ASCII string | Battery model is up to 30 characters (may not be null-terminated) |

Table 23 specifies value for the Command and Sub-command fields, Byte Count and Report Status bytes, and data bytes of a "Battery Information" Data Report message (indicated in Tables 1 and 5 above) of the "Battery Type" type (indicated in Table 6 above).

TABLE 23

Battery Type Report

| SMB Protocol Byte | Description | Note |
|---|---|---|
| Command Byte | 22h | |
| Byte Count | N = 03h-20h | |
| Data Byte 1 (Sub-Command) | XEh | X = 0h for Battery in Slot 0 |
| | | X = 1h for Battery in Slot 1 |
| | | X = 2h for Battery in Slot 2 |
| | | X = 3h for Battery in Slot 3 |
| Data Byte 2 (Report Status) | 00h | Successful |
| Data Byte 3- Data Byte N | ASCII string | Battery type (commonly battery chemistry) is up to 30 characters (may not be null-terminated). |

In some embodiments, EC/KBC 11 is configured to follow the following behavioral rules for communication with microprocessor 5 over the SMB:

After Power On Reset, EC/KBC 11 is ready to accept PMD request messages over the SMB and respond to them as soon as possible with the following time-out limits:

After an EC Capabilities Request is received, the responsive EC Capabilities Report is sent over the SMB within 25 ms, After a System Status Request is received, the responsive System Status Report is sent over the SMB within 25 ms, After any Battery Information Request is received, the respective Data Report is sent over the SMB within 50 ms, and Action Requests are executed immediately upon receipt.

After Power On Reset, EC/KBC 11 does not initiate any report messages (although it may send report messages in response to requests from microprocessor 5) until a first System Status Report is successfully sent in response to request therefore from microprocessor 5.

After the first System Status Report has been sent, EC/KBC 11 will initiate subsequent System Status Reports by itself whenever any status information changes (e.g., if a battery is connected or removed, or system sleep state changes, etc.). In some implementations, there is an exception to this rule: in the case that GPIO state is changed by EC/KBC 11 in response to a GPIO control action request from microprocessor 5, EC/KBC 11 may not generate a System Status Report.

EC/KBC 11 is configured to handle the case that a new Data Request is received from microprocessor 5 before EC/KBC 11 has sent one or more previously requested Data Reports in response to one or more previous Data Requests. In some implementations, EC/KBC 11 responds with one Data Report to all duplicated Data Requests (with the same command and sub-commands fields).

Figure 3:
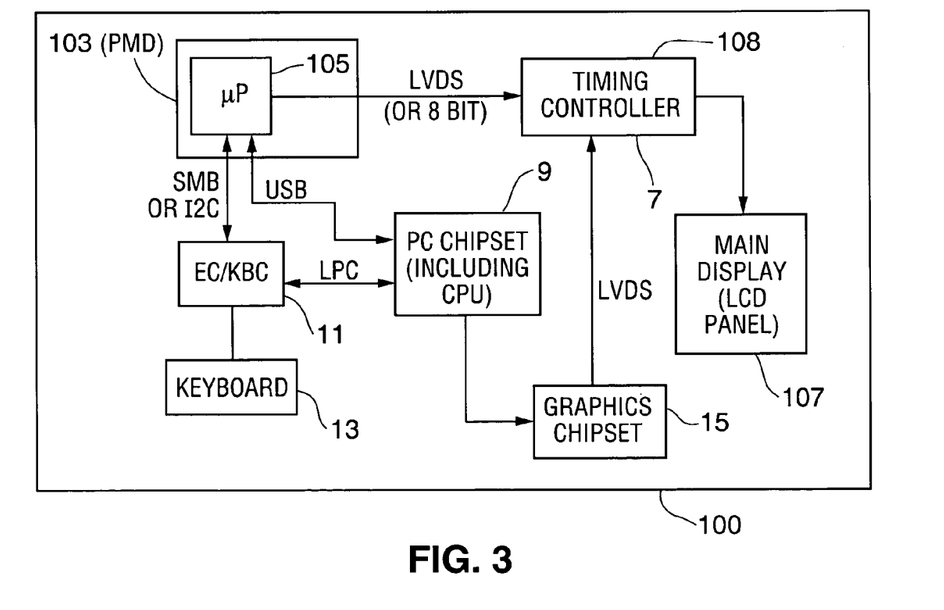
FIG. 3 is a block diagram of an embodiment of the inventive notebook which includes an auxiliary display subsystem (PMD 103), a main graphics subsystem (graphics chipset 15), and a timing controller (108) configured to assert display data from microprocessor 5 of PMD 103 (or a scaled or otherwise processed version of such data) and/or from chipset 15 to main display 107 with timing for display on all or a selected portion of main display 107's screen.

Notebook 100 of FIG. 3 is an embodiment of the inventive notebook which includes an auxiliary display subsystem (PMD 103) coupled by an SMB or I2C bus to an embedded controller (EC/KBC 11) of notebook 100. All elements of FIG. 3 that correspond to identical elements of above-described FIG. 1 are numbered identically in FIGS. 1 and 3, and the description thereof will not be repeated with reference to FIG. 3.

Notebook 100 differs from notebook 1 in that PMD 103 of notebook 100 does not include its own auxiliary display. PMD 103 generates display data of the same type that are displayed on auxiliary display 7 of notebook 1, but sends the display data to timing controller 108 (following optional processing) with proper timing for display on all or part of the screen of main display 107. Main display 107 of notebook 100 can be identical to main display 17 of notebook 1, but is coupled to receive display data from timing controller 108 rather than display data directly from graphics chipset 15. Alternatively, main display 107 is replaced by a main display that includes timing controller 108 and an array of pixels (backlit liquid crystal cells or other light-emitting elements), and timing controller 108 asserts display data to the pixels (or column drivers or other pixel driving circuitry) of the main display.

Timing controller 108 is configured to be operable in a mode in which it generates display data from raw display data asserted thereto by microprocessor 105 (e.g., by scaling the raw display data) and asserts the scaled data with timing for display on the screen of display 107 (e.g., in a small region of the screen of display 107), and also to be operable to assert display data from graphics chipset 15 for display on the screen of display 107. Optionally, timing controller 108 is configured to be operable in a mode in which it combines (multiplexes) display data from microprocessor 105 (or a scaled version of such data) with display data from graphics chipset 15 (e.g., so that data from microprocessor 105 or a scaled version thereof can be displayed in a small region of display 107's screen, while display data from graphics chipset 15 is displayed on the rest of display 107's screen).

Preferably, display 107 is an LCD of a type whose pixels (individual backlit liquid crystal cells) can be independently lit (e.g., independently backlit by independently controllable LEDs or other light sources) or a display of another type whose pixels can be independently powered and lit (e.g., independently backlit by independently controllable LEDs or other light sources). In such preferred embodiments, microprocessor 105 generates display data and asserts the display data (e.g., as 8-bit display data over a parallel link, or as serial data over an LVDS, or "low voltage differential signaling," serial link) for display in only a small region of the screen of display 107, and timing controller 108 asserts the display data (or a scaled version thereof) to the screen of display 107 with appropriate timing for display in the appropriate small region of display 107's screen. Microprocessor 105 is preferably configured to power only the pixels of display 107's screen in the region in which the display data from PMD 103 are to be displayed, thereby conserving power (e.g., when notebook 100 is in a sleep or other low-power state).

In the case that microprocessor 105 of PMD 103 is coupled by an SMB to EC/KBC 11, microprocessor 105 can be identical to microprocessor 5 of FIG. 1. In this case, messages are preferably sent between microprocessor 105 and EC/KBC 11 in the format described above with reference to Tables 1-23. In the case that microprocessor 105 of PMD 103 is coupled by an I2C bus to EC/KBC 11, messages of the same type described above with reference to Tables 1-23 can be sent between microprocessor 105 and EC/KBC 11 in an appropriate format that will be apparent to those of ordinary skill in the art in view of the description herein.

Figure 4:
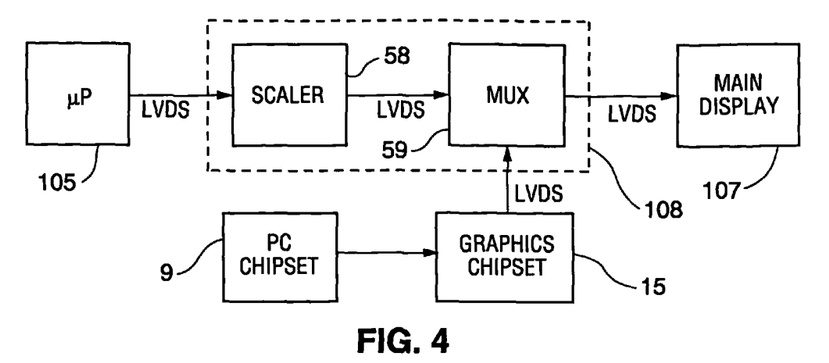
FIG. 4 is a block diagram of a subsystem of the notebook FIG. 3, including elements of an implementation of timing controller 108.

In the implementation shown in FIG. 4, timing controller 108 includes scaling circuit ("scaler") 58 and multiplexer 59, connected as shown. Scaler 58 is coupled and configured to generate display data by scaling raw display data asserted thereto (as serial data over an LVDS link, or over another link) from microprocessor 105, and to assert the display data over an LVDS link (or other link) to multiplexer 59. In some embodiments, scaler 58 is operable (under control of microprocessor 105) in at least two modes: a mode in which it downscales the raw display data both horizontally and vertically; and a mode in which it passes through the raw display data without scaling it. Multiplexer 59 has an input coupled to receive the display data output from scaler 58, a second input coupled to receive display data asserted by graphics chipset 15 over an LVDS link (or other link) between chipset 15 and multiplexer 59, and an output coupled to main display 107 by an LVDS link (or other link). Multiplexer 59 can be controlled to assert the data it receives from scaler 58 to main display 107 with timing for display in a region (e.g., determined by control bits or other signals from microprocessor 105) of display 107's screen. For example, when no display data are asserted from graphics chipset 15 to multiplexer 59 (e.g., when notebook elements including PC chipset 9 and graphics chipset 15 are in a standby state or other low-power state), multiplexer 59 can assert the data it receives from scaler 58 to main display 107, with timing for display in a small region of display 107's screen (e.g., with no display of data on the rest of display 107's screen). Multiplexer 59 can be controlled (e.g., while the notebook is in a fully powered state) to assert the data it receives from graphics chipset 15 (rather than the data it receives from scaler 58) to main display 107 with timing for display on display 107's screen.

In some embodiments, multiplexer 59 can be controlled to generate combined data by multiplexing the data received at its inputs, and to assert the combined data to main display 107 with timing such that when the combined data are displayed on main display 107, display data from microprocessor 105 (or a scaled version thereof) are displayed in a region (e.g., a small region) of display 107's screen, and display data from graphics chipset 15 are displayed on the rest of display 107's screen.

In alternative embodiments, scaler 58 is omitted and timing controller 108 includes a multiplexer (e.g. multiplexer 59) that can be controlled to assert raw auxiliary display data it receives from microprocessor 105 (or another element of an auxiliary display subsystem) to main display 107 for display on display 107's screen. Preferably, such multiplexer can also be controlled (e.g., while the notebook is in a fully powered state) to assert data it receives from graphics chipset 15 (rather than data it receives from the auxiliary display subsystem) to main display 107 with timing for display on display 107's screen.

Figure 5:
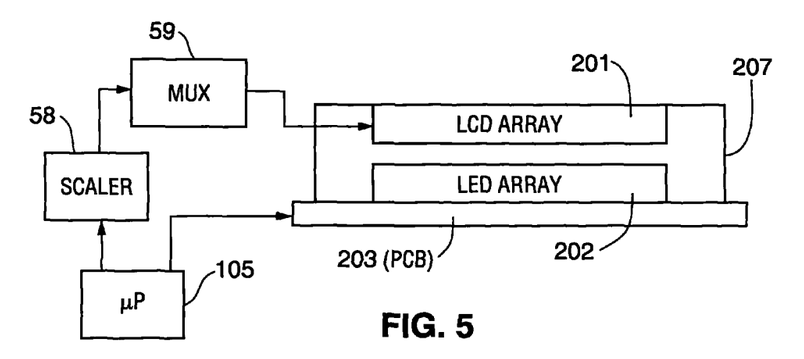
FIG. 5 is a simplified side cross-sectional view of a main display (LCD panel 207) that can be included in an embodiment of the inventive notebook, showing elements of the FIG. 4 subsystem coupled thereto.
Figure 6:
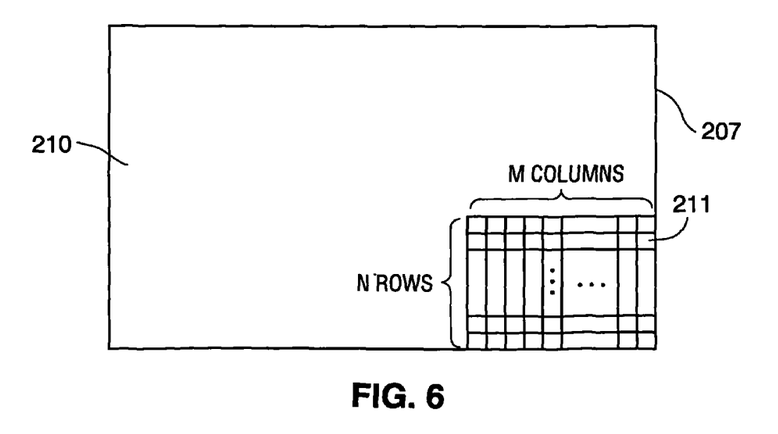
FIG. 6 is a front view of the screen (210) of main display 207 of FIG. 5, showing some pixels 211 thereof.

Main display 107 can be implemented as shown in FIGS. 5 and 6 as an LCD panel 207 (to be referred to herein as main display 207). Main display 207 includes an array 201 of LCD cells and an array 202 of LEDs for illuminating the LCD cells of array 201. Each LED of array 202 underlies an LCD cell (or a small number of adjacent LCD cells) of array 201 and is capable of backlighting the LCD cell or cells that it underlies. Array 202 is mounted on printed circuit board (PCB) 203. PCB 203 implements a circuit for independently powering the individual LEDs of array 207. This circuit is controlled by control signals asserted thereto from microprocessor 105. In typical operation in which microprocessor 105 controls scaler 58 and multiplexer 59 to cause the display of scaled data from microprocessor 105 in a region of display 107's screen (i.e., a small region determined by a backlit subset of the LCD cells of array 201), microprocessor 105 asserts control signals to PCB 203 to cause only those LEDs of array 207 that underlie the relevant subset of the LCD cells of array 201 to be powered.

Thus, microprocessor 105 can control the consumption of power by main display 207 to prevent consumption of power by those pixels that are not needed to display scaled data from microprocessor 105 in a region (e.g., a small region) of display 107's screen. With reference to FIG. 6, microprocessor 105 may assert display data to timing controller 108, and control the timing controller 108 to cause the display of scaled version of this data on a region of screen 210 (of display 207) determined by N rows of M columns of the pixels 211 of display 207 (where display 207 has many more than N rows of pixels 211 and many more than M columns of pixels 211). Each pixel 211 is determined by an LCD cell of array 201. Preferably, only those LEDs of array 207 that underlie the relevant subset of LCD cells of array 201 are powered (to backlight those LCD cells) while the scaled data are displayed in the N pixel×M pixel region on display 207's screen.

In other embodiments of the inventive notebook, a main display (e.g., main display 107 of FIG. 4) includes an array of LCD cells and an array of independently controllable light sources (other than LEDs) for backlighting either selected subsets of the LCD cells or all of the LCD cells of the LCD cell array, and an element of the notebook's auxiliary display subsystem (e.g., microprocessor 105 of FIG. 4) can control the consumption of power by the main display to prevent consumption of power by pixels of the main display that are not needed to display data generated by the auxiliary display subsystem (or a processed version of such data). For example, the auxiliary display subsystem that includes microprocessor 105 of FIG. 4 may prevent consumption of power by pixels of such an implementation of main display 107 that are not needed to display (in a small region of display 107's screen) a scaled version of data generated by the auxiliary display subsystem.

In other embodiments of the inventive notebook, a main display (e.g., main display 107 of FIG. 4) is of another type whose pixels can be independently powered and lit (e.g., independently backlit by independently controllable LEDs or other light sources), and an element of the notebook's auxiliary display subsystem (e.g., microprocessor 105 of FIG. 4) can control the consumption of power by main display 107 to prevent consumption of power by those pixels of the main display that are not needed to display data generated by the auxiliary display subsystem (or a processed version of such data).

In a class of implementations of the FIG. 4 circuitry, microprocessor 105 (or another element of the auxiliary display subsystem that includes microprocessor 105) generates display data and asserts the display data as serial data over an LVDS serial link for display (or processing followed by display) on the main display of a notebook. In other embodiments, an auxiliary display subsystem generates display data and asserts the display data (e.g., as 8-bit display data, or N-bit display data where N is not equal to 8, over a parallel link, or as serial data over a serial link other than an LVDS link) for display on the main display of a notebook (e.g., in only a small region of the screen of the main display).

In a class of embodiments of the inventive notebook, an auxiliary display subsystem (e.g., microprocessor 105 or another element of the auxiliary display subsystem that includes microprocessor 105) and a main display of the notebook are configured to power selected pixels of the main display in a region of the main display's screen in which data from the auxiliary display subsystem (or a scaled version of such data) are to be displayed, thereby conserving power (e.g., when the notebook is in a sleep or other low-power state).

Another aspect of the invention is a method for displaying auxiliary display data from an auxiliary display subsystem of a notebook on a main display of the notebook, said main display having a screen. The method includes the steps of:

(a) asserting raw auxiliary display data to a subsystem of the notebook;

(b) scaling the raw auxiliary display data in said subsystem to generate auxiliary display data; and (c) asserting the auxiliary display data to the main display with timing for display on a portion of the screen.

Step (b) can include the step downscaling the raw auxiliary display data to generate the auxiliary display data. All or some of steps (a), (b), and (c) can be performed while the notebook is in a low-power state.

In embodiments in which step (c) includes the steps of asserting the auxiliary display data to a multiplexer and controlling the multiplexer to pass through the auxiliary display data to the main display, the method can also include the steps of: (d) asserting main display data, from a main graphics subsystem of the notebook, to the multiplexer; and (e) controlling the multiplexer to pass through at least some said main display data to the main display. All or some of steps (a), (b), and (c) can be performed while the notebook is in a low-power state, and steps (d) and (e) can be performed while the notebook is in a fully powered state.

It should be understood that while some embodiments of the present invention are illustrated and described herein, the invention is defined by the claims and is not to be limited to the specific embodiments described and shown.

What is claimed is:

1. A system comprising:
   a graphics processor operable to access first data;
   an auxiliary processor operable to access second data;
   input devices coupled to said auxiliary processor and operable to receive user input;
   memory coupled to said auxiliary processor and configured to store user identity data;
   a controller coupled to said graphics processor and said auxiliary processor wherein said controller is separate from said graphics processor and said auxiliary processor and receives inputs from said graphics processor and said auxiliary processor;
   a display screen coupled to said controller, wherein said display screen comprises a first region and a second region,
   wherein said controller is operable to communicate said first data to said display screen for display using said first region, wherein said controller is operable to communicate said second data to said display screen for display using said second region,
   wherein said auxiliary processor is operable to authenticate a user's access to said system based on said user identify data stored in said memory and said user input when said graphics processor remains in a power-saving mode.

2. The system of claim 1, wherein said controller comprises a scaling component operable to perform a scaling operation on said second data for display on said display screen.

3. The system of claim 2, wherein said scaling operation comprises a downscaling of said second data.

4. The system of claim 1, wherein said controller comprises a multiplexer, and wherein said multiplexer is operable to select between said first data and said second data for communication to said display screen.

5. The system of claim 1, wherein said controller is operable to communicate said first data to said display screen for display thereon in accordance with first timing, and wherein said controller is operable to communicate said second data to said display screen for display thereon in accordance with second timing.

6. The system of claim 1, wherein said first region comprises substantially all of a displayable area of said display screen.

7. The system of claim 1, wherein said first region comprises said second region.

8. The system of claim 1, wherein said second region is smaller than said first region.

9. The system of claim 1, wherein said second data comprises data selected from a group consisting of an indication that a component of said system is on, an indication that a component of said system is off, an indication that a component of said system is powering up, and an indication that a component of said system is shutting down.

10. The system of claim 1, wherein said second data comprises data selected from a group consisting of an indication that a component of said system is in a standby state, an indication that a component of said system is in a suspended state, and an indication that a component of said system is in a hibernation state.

11. The system of claim 1 further comprising:
    a battery; and
    wherein said second data comprises data selected from a group consisting of an indication that said battery is charging, an indication that said battery is discharging, a charge level of said battery, and a low battery alarm associated with said battery.

12. The system of claim 1, wherein said second data comprises data selected from a group consisting of an indication that communication with a component of said system is in progress, an indication associated with a program executed by said graphics processor, a current date, and a current time, wherein said controller is configured to communicate said second data to said auxiliary processor when said graphics processor remains in said power-saving mode.

13. The system of claim 1, wherein said display screen is a liquid crystal display.

14. The system of claim 1, wherein said display screen comprises a plurality of light emitting diodes operable to illuminate an image displayed on said display screen.

15. A method of processing data for display using a system, said method comprising:
    accessing first data using a graphics processor;
    accessing second data using an auxiliary processor;
    communicating said first data, using a controller, to a display screen for display in a first region of said display screen wherein said controller is separate from said graphics processor and said auxiliary processor and receives inputs from said graphics processor and said auxiliary processor, wherein said controller is operable to scale data received from said auxiliary processor and output the scaled data to downstream components via a multiplexer;
communicating said second data, using said controller, to said display screen for display in a second region of said display screen;
storing user identity data in a cache coupled to said auxiliary processor; and
said auxiliary processor authenticating a user based on said user identity data when said graphics processor remains in a power-saving mode.

16. The method of claim 15, wherein said communicating said first data is performed contemporaneously with said communicating said second data, and further comprising:
performing, using said controller, a scaling operation on said second data.

17. The method of claim 16, wherein said scaling operation comprises a downscaling of said second data.

18. The method of claim 15 further comprising:
selecting between, using a multiplexer of said controller, said first data and said second data for communication to said display screen.

19. The method of claim 15, wherein said communicating said first data further comprises communicating said first data to said display screen for display thereon in accordance with first timing, and wherein said communicating said second data further comprises communicating said second data to said display screen for display thereon in accordance with second timing.

20. The method of claim 15, wherein said first region comprises substantially all of a displayable area of said display screen.

21. The method of claim 15, wherein said first region comprises said second region.

22. The method of claim 15, wherein said second region is smaller than said first region.

23. The method of claim 15, wherein said second data comprises data selected from a group consisting of an indication that a component of said system is on, an indication that a component of said system is off, an indication that a component of said system is powering up, and an indication that a component of said system is shutting down.

24. The method of claim 15, wherein said second data comprises data selected from a group consisting of an indication that a component of said system is in a standby state, an indication that a component of said system is in a suspended state, and an indication that a component of said system is in a hibernation state.

25. The method of claim 15, wherein said second data comprises data selected from a group consisting of an indication that a battery of said system is charging, an indication that said battery is discharging, a charge level of said battery, and a low battery alarm associated with said battery.

26. The method of claim 15, wherein said second data comprises data selected from a group consisting of an indication that communication with a component of said system is in progress, an indication associated with a program executed by said graphics processor, a current date, and a current time.

27. The method of claim 15, wherein said display screen is a liquid crystal display.

28. The method of claim 15, wherein said display screen comprises a plurality of light emitting diodes operable to illuminate an image displayed on said display screen.

29. The system of claim 1, wherein said auxiliary processor is further operable to conserve power by powering only a portion of a backlight corresponding to said second region.

30. A system comprising:
a first processor operable to access first data;
a first display device coupled to said first processor, wherein said first display device is operable to display said first data;
a second processor operable to access second data;
memory coupled to said second processor and configured to store user identity data; and
a second display device coupled to said second processor, wherein said second display device is operable to display said second data contemporaneously with a configuration of said first processor in a low-power state, and
wherein said second processor is further operable to change a power state of said first processor and wherein a controller separate from said first processor and said second processor receives inputs from said first processor and said second processor, and wherein said controller is operable to scale data received from said second processor and output the scaled data to downstream components via a multiplexer; and
wherein said second processor is operable to authenticate a user's access to said system based on said user identity data stored in said memory when said first processor remains in said low-power mode.

31. The system of claim 30 further comprising:
a memory coupled to said second processor;
a communication component coupled to said second processor;
an audio output component coupled to said second processor;
a user interface component coupled to said second processor; and
wherein said memory, said communication component, said audio output component, and said user interface component are functional while said first processor is in said low-power state.

32. The system of claim 31 further comprising:
a housing comprising a cover; and
wherein said user interface component is accessible when said cover is in a closed position.

33. The system of claim 30, wherein said second data comprises data selected from a group consisting of an indication that a component of said system is on, an indication that a component of said system is off, an indication that a component of said system is powering up, and an indication that a component of said system is shutting down.

34. The system of claim 30, wherein said second data comprises data selected from a group consisting of an indication that a component of said system is in a standby state, an indication that a component of said system is in a suspended state, and an indication that a component of said system is in a hibernation state.

35. The system of claim 30 further comprising:
a battery; and
wherein said second data comprises data selected from a group consisting of an indication that said battery is charging, an indication that said battery is discharging, a charge level of said battery, and a low battery alarm associated with said battery.

36. The system of claim 30, wherein said second data comprises data selected from a group consisting of an indication that communication with a component of said system is in progress, an indication associated with a program executed by said first processor, a current date, and a current time.

37. The system of claim 30, wherein said first display device and said second display device are each liquid crystal displays.

38. The system of claim 30, wherein said first display device comprises a first plurality of light emitting diodes operable to illuminate an image displayed on said first display device, and wherein said second display device comprises
- a second plurality of light emitting diodes operable to illuminate an image displayed on said second display device.

* * * * *